Patented Sept. 2, 1930

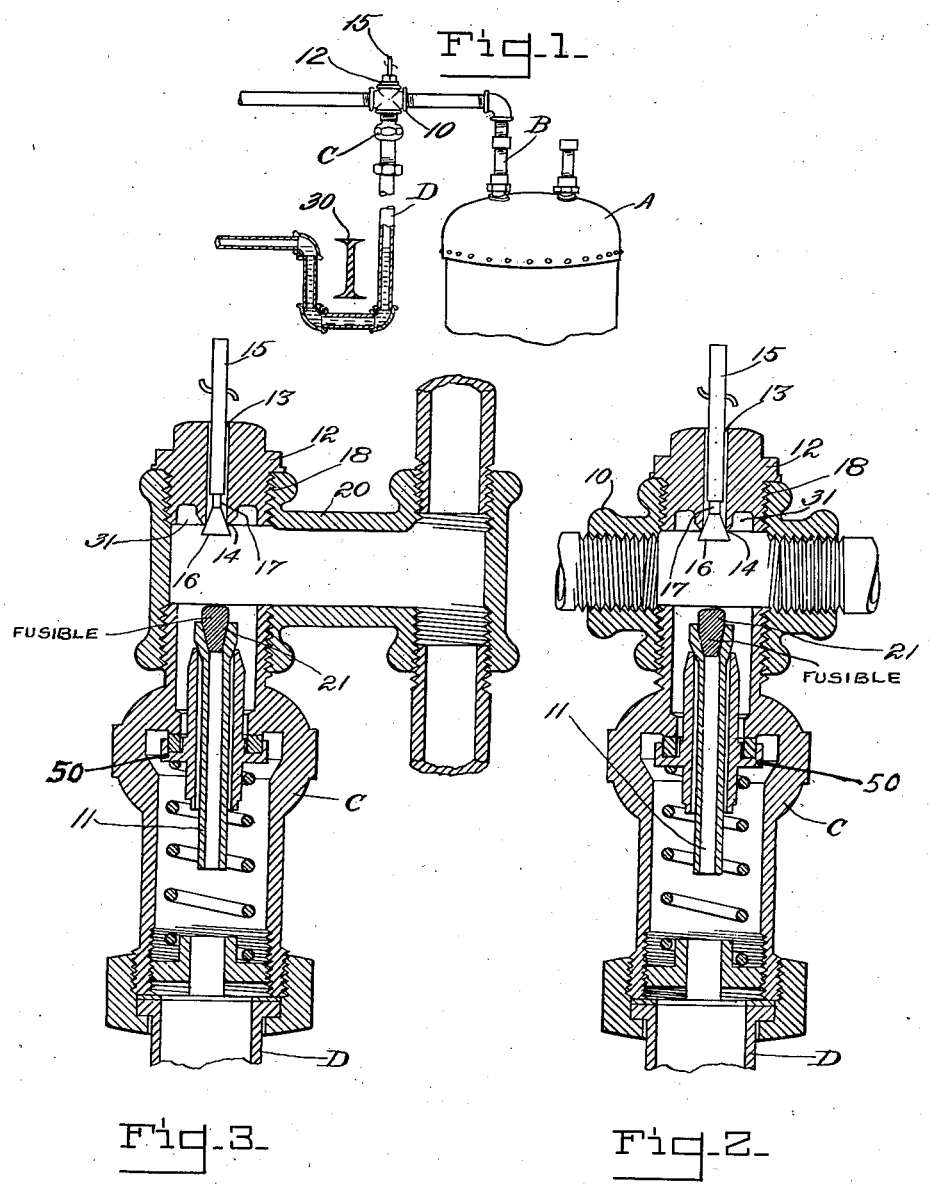

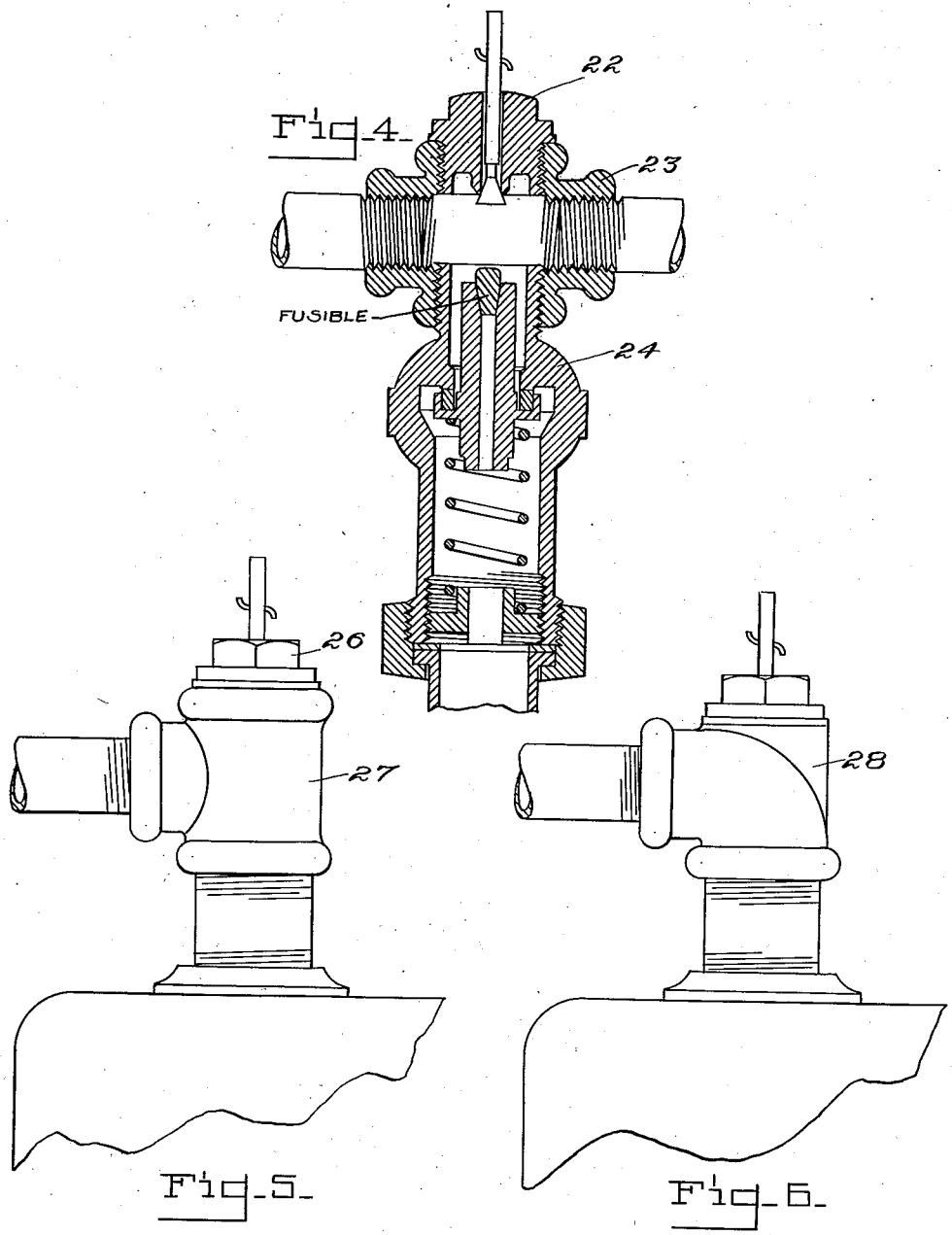

1,774,805

UNITED STATES PATENT OFFICE

JOSEPH A. MAYNARD, OF BOSTON, MASSACHUSETTS

RELIEF VALVE FOR HOT-WATER SYSTEMS

Application filed November 18, 1926. Serial No. 149,080.

My present invention relates to relief valves for use particularly on hot water systems intended to supply hot water for domestic purposes. As is well known to those familiar with the operation of automatic gas hot water heaters particularly for the supply of hot water for domestic uses it has been customary to provide valves which will relieve the heating system from undue strain under three conditions: First, when steam and consequently pressure is generated in the system; second, when the temperature in the system rises above a predetermined point and third, in case of formation of a vacuum in the system.

It has frequently been found in practice that failures from internal vacuum sometimes occur even though the system is provided with a vacuum relief valve, and I have traced these failures often to the fact that the vacuum relief valve opens into a waste pipe instead of into the open air and that this waste pipe is frequently trapped or connected to a waste system which is trapped or is led away in bends or curves to avoid beams or other obstacles, the bends or curves forming in effect traps which prevent a free flow of air through the vacuum valve into the boiler when the pressure in the boiler drops below atmospheric pressure.

One of the objects of this invention, therefore, is to overcome the foregoing disadvantages and to provide an improved relief device of relatively simple and compact construction in which relief may be obtained in the event of excessive temperature, pressure or vacuum in the hot water system and in which the parts are arranged and constructed for more efficient and reliable service.

The valve and system embodying my invention is simple and overcomes all the difficulties which have heretofore been experienced as the result of trapping the waste pipe from the relief valve—whether intentionally or otherwise.

Referring now to the drawings:

Fig. 1 is a view of a portion of a hot water system to which is applied a relief valve embodying my invention, the system being also supplied with a trapped valve of the type shown in my prior application.

Fig. 2 is a vertical central section of the relief valve illustrated in Fig. 1.

Fig. 3 shows another application of a valve embodying my invention.

Fig. 4 shows a valve embodying my invention used in combination with a temperature and pressure relief valve.

Figs. 5 and 6 show other installations.

Referring now to the drawings and particularly to Fig. 1, at A is shown a hot water boiler and at B a pipe connected to the said boiler. In practice this is preferably the supply pipe of the boiler. At C is shown a relief device intended to protect the boiler against pressure, temperature or vacuum. This device may comprise a spring pressed pressure valve 50 carrying a tube 11 which has a central passage normally closed at its upper end by a fusible plug 21 exposed to temperature by the inner chamber in the member 20. The upper end of the tube 11 may be formed to provide a vacuum relief valve. At D is shown a waste pipe which is intended to carry off any waste resulting from the relief of the boiler and thus to prevent flooding of the room where the boiler is located. This pipe is shown in Fig. 1 as carried around an I-beam 30 and forming a trap unintentionally, since the water will accumulate in the U-shaped bend underneath the I-beam. It will be evident therefore that in a system constructed as described, when the vacuum relief valve 11, forming part of the temperature pressure vacuum relief valve C, lifts on account of the formation of a vacuum in a boiler, no air can enter the boiler until the suction is great enough to break the water seal in the trap or loop in the pipe D.

Referring to Figs. 2 and 3 I provide a cap 12 (see Fig. 2) having a passage 13 drilled therethrough and provided with a valve seat 14 surrounding the orifice of the passage 13. The valve seat 14 is surrounded by an annular recess 31 which narrows the surface immediately adjacent the seat and prevents the accumulation of sediment which might interfere with the operation of the valve. Within this passage 13 is placed a valve member 15 having a head 16 which, when the valve is seated rests against the seat 14. The stem of the valve is smaller than the passage 13 and is cut away as shown at 17 to provide sufficient clearance for the passage of air when the valve is open. The plug or cap 12 is screw threaded as shown at 18 and is screwed into the pipe B at some suitable point. Where a temperature-pressure-vacuum-relief-valve of the kind shown in my prior application and indicated at C in Figs. 1, 2 and 3 is employed I prefer to use a cross fitting 10 and to screw the cap 12 into the opening which is opposite the relief valve C. This construction is shown in Figs. 1 and 2. If preferred an H-fitting 20 like that shown in Fig. 3 may be employed. When installed in either of these ways it will be seen that the fusible plug 21 of the temperature-pressure-vacuum-relief-valve C is opposite the cap 12 so that in case the plug 21 melts out to relieve the boiler in case of excessive temperature it can be replaced by removing the cap 12.

When the pressure in the boiler A becomes less than atmospheric the valve 16 opens inwardly and allows air to enter the system thus preventing the collapse of the boiler. When water is again supplied to the boiler from the city water main or other water supply, the air in the boiler is driven out through the orifice violently since the pressure in the water main is much greater than that of the atmosphere and the orifice is very small in comparison with the size of the water main. When sufficient velocity of the air or water escaping through the orifice is attained, the valve snaps shut and thereafter is held closed by the pressure in the boiler.

In Fig. 4 I have shown a vacuum relief valve 22 made in accordance with the present invention installed in a cross fitting 23 opposite to a temperature and pressure relief valve 24. In this case the vacuum valve seated in the plug 22 will be relied on solely to relieve the system from vacuum while the relief valve 24 will take care of excessive pressure or excessive temperature.

In Fig. 5 I have shown a vacuum valve 26 installed in a T-fitting 27 and employed merely for the purpose of relieving the vacuum in a system which may or may not be protected against excessive temperature or pressure.

In Fig. 6 I have shown the use of my valve in connection with an elbow 28.

From the foregoing it will be seen that I provide a relief valve device not only of simple and compact construction but also capable of giving the desired relief at the proper time while also having the advantage of providing access to the various parts of the valve. It will be noted that the pressure relief valve 50 carried by the body C and the fusible plug 21 are exposed to pressure and temperature in the inner chamber formed by the fitting or coupling 20. Moreover, the cap 12 is located opposite the fusible plug 21 and can be readily removed to permit access to the fusible plug as well as to other parts carried by the member C. This cap 12 in turn is so constructed as to provide a vertical passage 13 carrying a vacuum valve which opens freely into the inner chamber, this valve being mounted in position so as to close the passage in the cap solely by a predetermined pressure in the boiler.

What I claim is:

1. A relief device insertable in the water supply line to a boiler or the like, comprising a casing having an inner chamber communicating with said supply line and an outer discharge chamber, a pressure relief valve interposed between said chambers and movable to open a passage therebetween, a fusible plug exposed to temperature in said inner chamber for opening another passage to the discharge chamber, a cap secured to the casing opposite said plug and removable to permit access to said fusible plug, and a vacuum valve carried by said cap and movable into said inner chamber to open a passage directly to the atmosphere.

2. A relief device insertable in the water supply line to a boiler or the like, comprising a casing having an inner chamber communicating with said supply line and an outer discharge chamber, a pressure relief valve interposed between said chambers and movable to open a passage therebetween, a fusible plug exposed to temperature in said inner chamber for opening another passage to the discharge chamber, a cap secured to the casing opposite said fusible plug and removable to permit access thereto, said cap having a substantially vertically extending passage from the atmosphere to said inner chamber, and a vacuum relief valve having a guide stem freely slidable in said passage and opening downwardly into the chamber and maintained in position to close said passage solely by predetermined pressure in the boiler.

In testimony whereof I affix my signature.

JOSEPH A. MAYNARD.